(No Model.)
J. HARRINGTON.
CASTER WHEEL.
No. 592,201. Patented Oct. 19, 1897.
Fig. 1.
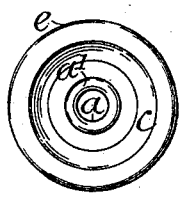
Fig. 2.
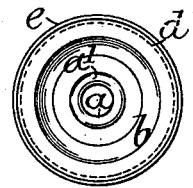
Fig. 3.
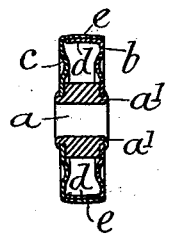
Fig. 4.
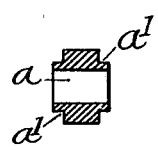
Fig. 7.
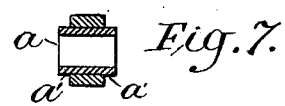
Fig. 5.
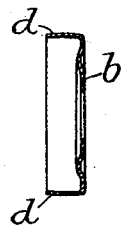
Fig. 6.
Witnesses:
Eugenie A. Oursides.
G W A Eisenbraun
Inventor:
John Harrington
by A Vaberdu Faur Jr.,
Atty.
THE NORRIS PETERS CO., PHOTO-LITHO., WASHINGTON, D. C.

United States Patent Office.

JOHN HARRINGTON, OF RYDE, ENGLAND, ASSIGNOR OF TWO-THIRDS TO HENRY BRENT, OF SAME PLACE, AND JAMES BURNS, OF WHITEHAVEN, ENGLAND.

CASTER-WHEEL.

SPECIFICATION forming part of Letters Patent No. 592,201, dated October 19, 1897.

Application filed April 16, 1896. Serial No. 587,810. (No model.)

*To all whom it may concern:*

Be it known that I, JOHN HARRINGTON, a subject of the Queen of Great Britain, residing at Ryde, in the Isle of Wight, England, have invented certain new and useful Improvements in Caster-Wheels; and I do hereby declare that the following is a full, clear, and exact description of the invention, which will enable others skilled in the art to which it appertains to make and use the same.

The invention relates to improvements in caster-wheels whereby cheapness of construction and other advantages are obtained.

According to my invention instead of making a caster-wheel of solid cast metal turned and finished or instead of making it of earthenware I build it up of a central metal bush or bearing and two metal side cheeks formed with a central hole and with cylindrical flanges of slightly-different sizes, so that the one may be forced into the other. The central bush or bearing is formed with a reduced part at each end to fit the holes in the center of the side cheeks and the ends of said bush or bearing are burred over onto the side cheeks to fix the parts together and, if desired, the edge of the larger cylindrical flange is burred over the junction of the smaller flange with its side cheeks. The sides or cheeks are stamped from sheet metal while the central bush or bearing may be made of suitable lengths of drawn tubing fitting tightly together and leaving a shoulder at each end for riveting or spinning over, or it may be cast.

The nature of my invention will best be understood when described in connection with the accompanying drawings, in which—

Figure 1 is an elevation as seen from the outer side; Fig. 2, a similar view to Fig. 1, but seen from the inner side; Fig. 3, a cross-section. Fig. 4 shows the central bush or bearing; and Figs. 5 and 6 show, respectively, the outer and the inner flanged side cheeks of a caster-bowl. Fig. 7 illustrates a modified manner of forming the central bush or bearing.

Similar letters of reference designate corresponding parts throughout the several views of the drawings.

$a$ is the central bush or bearing, which may be made solid, as shown at Fig. 4, or of two lengths of drawn tube, as shown at Fig. 7. It is formed with a reduced part $a'$ at each end thereof.

$b\ c$ are side cheeks having central holes therein fitting tightly the reduced ends $a'$ of the central bush or bearing $a$, and in this form of caster-wheel the cheeks are formed, respectively, with cylindrical flanges $d\ e$ of slightly-different diameter. The parts are placed in proper relative position and forced together, when the cylindrical flange $d$ will be forced into the flange $e$ and the central parts of the cheeks $b\ c$ over the reduced ends $a'$ of the central bush or bearing $a$. The ends of this latter are then burred or riveted over the side cheeks and the edge of the flange $e$ is preferably spun or burred over the junction of the flange $d$ with its side cheek $c$. The outer flange $e$ thus forms the running surface.

Having fully described my invention, what I desire to claim and secure by Letters Patent is—

1. A caster-wheel composed of a central hub provided with reduced ends, centrally-perforated side cheeks fitted over such reduced ends, and cylindrical flanges connected with said side cheeks and telescoping each other; the reduced ends of said hub being riveted or extended over the side cheeks to retain the parts securely in position, substantially as described.

2. In a caster-wheel, the combination of two side cheeks, a central hub composed of two tubes of different lengths fitted one within the other to form shoulders and reduced bearing ends extending beyond the shoulders for the reception of the side cheeks; the inner tube being riveted or extended over said side cheeks, substantially as described.

JOHN HARRINGTON.

Witnesses:
B. J. B. MILLS,
CLAUDE K. MILLS.